(12) United States Patent
Eckel

(10) Patent No.: US 9,929,677 B2
(45) Date of Patent: Mar. 27, 2018

(54) THREE-LEVEL ACTIVE NEUTRAL POINT CONVERTER

(71) Applicant: SIEMENS AKTIENGESELLSCHAFT, München (DE)

(72) Inventor: Hans-Günter Eckel, Rostock (DE)

(73) Assignee: SIEMENS AKTIENGELLSCHAFT, München (DE)

( * ) Notice: Subject to any disclaimer, the term of this patent is extended or adjusted under 35 U.S.C. 154(b) by 0 days.

(21) Appl. No.: 14/905,613

(22) PCT Filed: Jul. 8, 2014

(86) PCT No.: PCT/EP2014/064577
§ 371 (c)(1),
(2) Date: Jan. 15, 2016

(87) PCT Pub. No.: WO2015/007569
PCT Pub. Date: Jan. 22, 2015

(65) Prior Publication Data
US 2016/0181948 A1    Jun. 23, 2016

(30) Foreign Application Priority Data
Jul. 17, 2013 (DE) .......... 10 2013 213 986

(51) Int. Cl.
*H02M 7/537* (2006.01)
*H02M 1/32* (2007.01)
*H02M 7/487* (2007.01)

(52) U.S. Cl.
CPC ............. *H02M 7/537* (2013.01); *H02M 1/32* (2013.01); *H02M 7/487* (2013.01)

(58) Field of Classification Search
CPC ........ H02M 7/003; H02M 7/48; H02M 7/122; H02M 7/537; H02M 7/538; H02M 7/5387; H02M 1/32; Y02B 70/1441; H02J 1/102
(Continued)

(56) References Cited

U.S. PATENT DOCUMENTS 5,383,108 A    1/1995 Okayama
6,522,561 B1    2/2003 Wobben
(Continued)

FOREIGN PATENT DOCUMENTS

CN    201118467 Y    9/2008
CN    201869116 U    6/2011
(Continued)

OTHER PUBLICATIONS

Different Short Circuit Types of IGBT Voltage Source inverters; Steffen Pierstorf, Hans-GÜnter Eckel PCIM Europe 2011, May 17.-19., Nürnberg, Paper 98, pp. 592 to 597; 2011.

*Primary Examiner* — Yemane Mehari
(74) *Attorney, Agent, or Firm* — Henry M. Feierseiesen LLC

(57) ABSTRACT

The invention relates to a active-neutral point clamped converter having at least one half-bridge circuit connected into a DC voltage circuit. Each half-bridge circuit has a high-potential-side input half-bridge and a low-potential-side input half-bridge in series. The half-bridge circuit further has an output half-bridge connected between center taps of the input half-bridges. The total inductance within the output half-bridges and between the three half-bridges is dimensioned such that if any of the power semiconductors of the half-bridge circuit fails, a short-circuit can be reliably disconnected via a shorted circuit formed between the three (Continued)

half-bridges of the half-bridge circuit by the intact power semiconductors in said shorted circuit.

10 Claims, 1 Drawing Sheet

(58) Field of Classification Search
USPC ..... 363/40, 41, 50, 55, 56.01, 56.02, 65, 98, 363/131, 132
See application file for complete search history.

(56) References Cited

U.S. PATENT DOCUMENTS

| | | | |
|---|---|---|---|
| 7,480,160 B2 | 1/2009 | Bakran | |
| 7,582,939 B2 | 9/2009 | Bakran | |
| 8,228,695 B2* | 7/2012 | Roesner | H02M 7/487 363/131 |
| 8,854,109 B2 | 10/2014 | Eckel | |
| 2007/0230226 A1* | 10/2007 | Lai | H02M 5/4585 363/65 |
| 2008/0060542 A1 | 3/2008 | Bakran | |
| 2010/0328833 A1 | 12/2010 | Michael | |
| 2011/0280055 A1* | 11/2011 | Nielsen | H02J 1/102 363/131 |
| 2012/0092912 A1 | 4/2012 | Eckel | |
| 2013/0094260 A1* | 4/2013 | Martini | H02M 7/483 363/97 |

FOREIGN PATENT DOCUMENTS

| | | |
|---|---|---|
| CN | 102882385 A | 1/2013 |
| CN | 202856630 U | 4/2013 |
| DE | 42 18 662 A1 | 1/1993 |
| DE | 198 43 692 C2 | 9/1998 |
| DE | 10 2005 049 208 A1 | 4/2007 |
| EP | 0 512 531 A2 | 11/1992 |
| EP | 2 323 249 A1 | 5/2011 |
| JP | 2001-028881 A | 1/2001 |
| SU | 942224 A1 | 7/1982 |

* cited by examiner

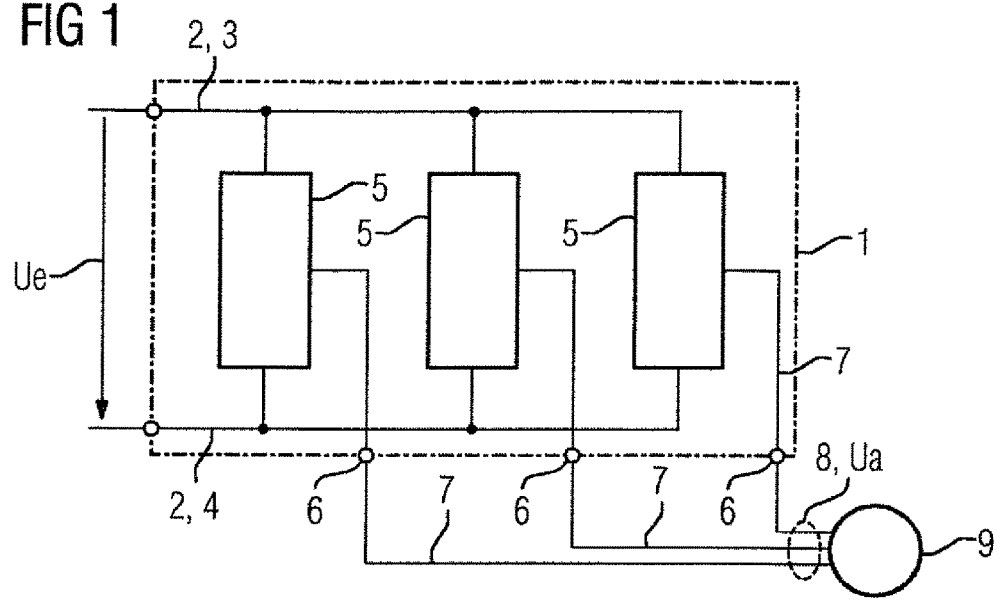
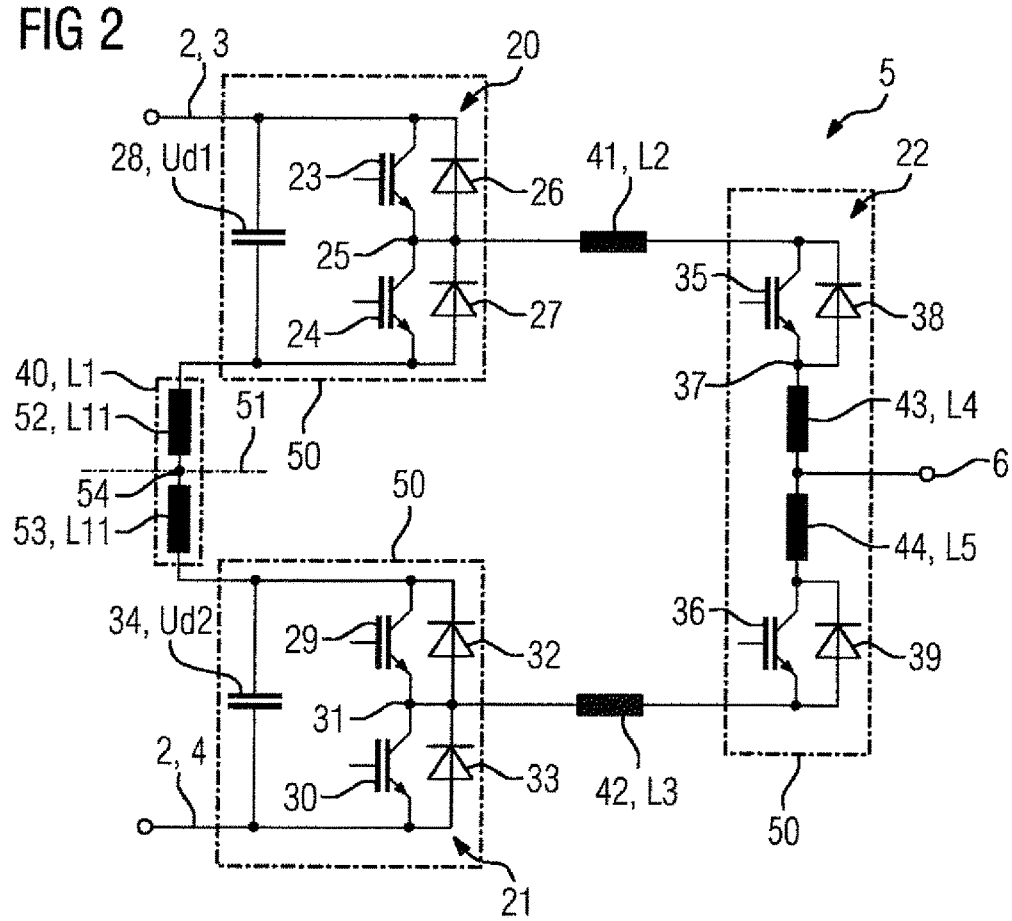

THREE-LEVEL ACTIVE NEUTRAL POINT CONVERTER

CROSS-REFERENCES TO RELATED APPLICATIONS

This application is the U.S. National Stage of International Application No. PCT/EP20141064577, filed Jul. 8, 2014, which designated the United States and has been published as International Publication No. WO 2015/007569 and which claims the priority of German Patent Application, Serial No. 10 2013 213 986.1, filed Jul. 17, 2013, pursuant to 35 U.S.C. 119(a)-(d).

BACKGROUND OF THE INVENTION

The invention relates to a three-level converter. A three-level converter is a circuit that uses power semiconductors (semiconductor switches and/or diodes, in particular) to convert a supplied input voltage into an output voltage wherein, in the static case in particular, this output voltage can assume three discrete values (or potential levels), for example the values "0", "½" and "1" in relation to the input voltage at any instant in time.

The three-level converter is in particular a three-level inverter, which converts a DC voltage supplied on the input side into an AC voltage output to a load circuit. The invention relates in particular to a three-level converter that is designed for use in the Megawatt range (e.g. in the range of 1 MW-20 MW), for example for a wind turbine or in a rolling mill.

In a three-level converter of this type, single faults (i.e. a failure of a single power semiconductor in the converter) can result in the failure of further power semiconductors as consequential faults. In particular, a failure of the power semiconductor concerned to go into the off-state causes the power semiconductor to be permanently on (even if it happens to be installed in a reverse-bias direction). The failure of a plurality of power semiconductors can result in low-inductance short-circuit paths within the converter or to multiphase short-circuits for the connected load. The short-circuit current that occurs in this case can cause a high transient torque in an electrical machine connected as a load to the converter. The transient torque anticipated for the short-circuit situation may be relevant to the design of the mechanical system of the connected electrical machine, and hence may require the mechanical design of this machine to be over-engineered.

In addition, the transient current in the event of a short-circuit results in a considerable load on the diodes in the load-side short-circuit path, and in the case of a complete bridge short-circuit even on all the diodes connected to the same DC circuit. In order to protect the diodes from damage by the transient current, chokes are often connected in series with a converter on the AC side. These chokes significantly increase costs, mass and occupied space. Furthermore, these chokes also cause higher losses and a lower output voltage.

SUMMARY OF THE INVENTION

The present invention provides a three-level converter that is improved with regard to the problems described above.

The three-level converter according to the invention has an input-side DC circuit, which comprises a high-potential rail and a low-potential rail. The DC circuit in particular may be a DC link circuit, which interconnects a rectifier stage and an inverter stage inside an AC/AC converter.

In addition, the three-level converter comprises at least one half-bridge circuit, which is connected between the high-potential rail and the low-potential rail. The three-level converter preferably comprises a plurality of (in particular three) half-bridge circuits, which are connected in parallel with one another between the high-potential rail and the low-potential rail. The half-bridge circuits are also referred to below as converter phases.

The three-level converter is designed as a three-level active neutral-point-clamped converter, as is known per se from DE 101 40 747 A1 for instance. The half-bridge circuit or each half-bridge circuit is formed for this purpose from three half-bridges, namely from
   a high-potential side (input) half-bridge,
   a low-potential side (input) half-bridge, and
   an (output) half-bridge.

The two input half-bridges are connected in series between the high-potential rail and the low-potential rail of the DC circuit. The output half-bridge, however, is connected on the input side between a center tap of the high-potential side input half-bridge and a center tap of the low-potential side input half-bridge. A center tap of the output half-bridge forms a phase terminal, to which a load circuit is intended to be connected or is connected.

The center tap of the high-potential side input half-bridge is referred to below as the "first center tap". The center tap of the low-potential side input half-bridge is likewise referred to below as the "second center tap". The center tap of the output half-bridge is likewise referred to below as the "third center tap". Each of the three center taps is located between two respective power semiconductors or two respective power semiconductor groups.

Thus each of the three half-bridges comprises one high-potential side semiconductor switch and one low-potential side semiconductor switch, in particular in series (i.e. connected in series), between which switches is located the center tap of that half-bridge.

Specifically, the high-potential side input half-bridge comprises a first high-potential side semiconductor switch and a first low-potential side semiconductor switch, which are connected in series via the first center tap. Correspondingly, the low-potential side input half-bridge comprises a second high-potential side semiconductor switch and a second low-potential side semiconductor switch, which are connected in series via the second center tap. Finally, the output half-bridge comprises a third high-potential side semiconductor switch and a third low-potential side semiconductor switch, which are connected in series via the third center tap. In particular, a clamping diode is connected in parallel with each semiconductor switch.

A capacitor is connected in parallel with each input half-bridge. These two capacitors are here preferably designed to have the same capacitance value so that in the static case, half of the input voltage lying between the high-potential rail and the low-potential rail is dropped across each input half-bridge. The electrical potential between the capacitors is denoted as the midpoint potential.

According to the invention, the total inductance (i.e. the sum of the individual inductances)
   within the output half-bridge,
   between the high-potential side input half-bridge and the low-potential side input half-bridge,
   between the high-potential side input half-bridge and the output half-bridge, and between the low-potential side input half-bridge and the output half-bridge is designed to have a value such that in the event of a failure of any one power semiconductor in the half-bridge circuit (or in one half-bridge circuit of what may be a plurality of half-bridge circuits), a short-circuit via a short-circuit path formed between the three half-bridges of this half-bridge circuit can be reliably cut off by the intact power semiconductors in this short-circuit path. Thus the focus of the invention is to cut off reliably short-circuits which are inside the converter and hence do not include the load circuit, but which extend beyond a single half-bridge within a half-bridge circuit.

In this context, the reliable cut-off manifests itself in particular as preventing electrical consequential faults across half-bridges in the event of a short-circuit, including especially in the event of failure of a power semiconductor. Systematic selection of the inductance values within the output half-bridge and between the three half-bridges of the half-bridge circuit or each half-bridge circuit thus eliminates the situation in which the rise in current or voltage resulting from a single fault (i.e. failure of a single power semiconductor of a half-bridge) causes the failure of at least one further power semiconductor of another half-bridge in the same half-bridge circuit.

Eliminating electrical consequential faults across half-bridges ensures that in the event of a single fault, at least half the input voltage is still maintained in the load circuit as a counter-electromotive force. The short-circuit current that flows in the event of a short-circuit can hence be reduced to about one third compared with conventional three-level converters. The transient torques and the load on the diodes in the converter are also reduced correspondingly.

The half-bridge circuit or each half-bridge circuit is preferably designed here such that said total inductance (Lg) has an inductance value between 100 nH (preferably 300 nH) and 10 µH (preferably 1 µH)

In order to set the total inductance, at least one choke (i.e. a discrete component in the form of a magnetic coil) is preferably arranged within the output half-bridge and/or
between the high-potential side input half-bridge and the low-potential side input half-bridge and/or
between the high-potential side input half-bridge and the output half-bridge and/or
between the low-potential side input half-bridge and the output half-bridge.

It is preferred here that within the output half-bridge a choke is arranged on each side of the third center tap. Additionally or alternatively, a further choke is preferably arranged between each of the three half-bridges of the half-bridge circuit or of each half-bridge circuit.

One or more of these chokes can be omitted, however, as long as the sufficiently large total inductance is maintained. In addition, one or more or even all the chokes can also be replaced by a parasitic inductance associated with the construction.

In an advantageous development of the invention, the three half-bridges of the half-bridge circuit or of each half-bridge circuit are separated mechanically, from one another in such a way as to rule out mechanical or thermal damage to, or impairment of, a half-bridge by one of the two other half-bridges of the same half-bridge circuit. This prevents the reliable short-circuit cut-off of the three-level converter being jeopardized by mechanical or thermal complications (mechanical or thermal consequential faults). For example, the individual half-bridges of the same half-bridge circuit are spaced sufficiently far apart (e.g. arranged with a distance of 10 cm to 1 m between each one) and/or are separated from one another by partition walls or a protective housing (e.g. made of sheet steel with a minimum wall thickness of 1 mm or made of plastic with a minimum wall thickness of 5 mm). In a multi-phase converter, however, according to the invention half-bridges from different half-bridge circuits can be housed in a common housing.

The DC circuit is preferably designed in such a way as to rule out an electrical flashover between the high-potential rail and the low-potential rail. For this purpose, the high-potential rail and the low-potential rail of the DC circuit are preferably separated by a partition wall made of electrically conductive material, in particular sheet steel, which partition wall is at the midpoint potential.

BRIEF DESCRIPTION OF THE DRAWING

The invention will be better understood when the exemplary embodiments of the invention described in greater detail below are considered in conjunction with the drawing, in which:

FIG. 1 shows in a schematically simplified block diagram a three-phase three-level converter having an input-side DC circuit, which comprises a high-potential rail and a low-potential rail, and having three half-bridge circuits, each of which is connected via a phase terminal to one phase of a three-phase load circuit, and FIG. 2 shows in an electrical circuit diagram one of the three half-bridge circuits of the converter shown in FIG. 1

Corresponding parts and variables are always denoted by the same reference signs in all the figures.

DETAILED DESCRIPTION OF PREFERRED EMBODIMENTS

The (three-level) converter 1 shown in FIG. 1 comprises on the input side a DC circuit 2, via which the converter 1 is supplied with a constant input voltage Ue. The DC circuit 2 comprises a high-potential rail 3 and a low-potential rail 4, between which lies the input voltage Ue.

The converter 1 also comprises three half-bridge circuits 5 (merely implied in FIG. 1), which are connected in parallel with one another between the high-potential rail 3 and the low-potential rail 4.

Each of the half-bridge circuits 5 (also referred to as converter phases) is connected via an associated phase terminal 6 to one associated phase 7 of a three-phase load circuit 8. An electrical machine 9, for example, is connected as the load in the load circuit 8.

During operation of the converter 1, the input voltage Ue is converted by the half-bridge circuits 5 into an output voltage Ua in the form of a three-phase AC voltage. The output voltage Ua is fed into the load circuit 8 via the phase terminals 6.

FIG. 2 shows in detail the design of one of the three identically designed half-bridge circuits 5.

As shown in the diagram, each of the half-bridge circuits 5 is divided into three half-bridges 20, 21 and 22, namely into a high-potential side (input) half-bridge 20,
a low-potential side (input) half-bridge 21, and
an (output) half-bridge 22.

The half-bridge 20 comprises a (first) high-potential side semiconductor switch 23 and a (first) low-potential side semiconductor switch 24, which are connected in series via a (first) center tap 25. Connected in parallel with each of the semiconductor switches 23 and 24 is a clamping diode 26 and 27 respectively. Connected in parallel with the series circuit of the semiconductor switches 23 and 24 is a capacitance 28, across which is dropped a voltage Ud1.

The half-bridge 21 comprises a (second) high-potential side semiconductor switch 29 and a (second) low-potential side semiconductor switch 30, which are connected in series via a (second) center tap 31. Connected in parallel with each of the semiconductor switches 29 and 30 is a clamping diode 32 and 33 respectively. Connected in parallel with the series circuit of the semiconductor switches 29 and 30 is a capacitance 34, across which is dropped a voltage Ud2.

Finally, the half-bridge 22 also comprises a (third) high-potential side semiconductor switch 35 and a (third) low-potential side semiconductor switch 36, which are connected in series via a (third) center tap 37. Connected in parallel with each of the semiconductor switches 35 and 36 is a clamping diode 38 and 39 respectively.

The semiconductor switches 23, 24, 29, 30, 35 and 36 are preferably each formed by an insulated-gate bipolar transistor (IGBT). Other semiconductor switches can also be used, however.

The half-bridges 20 and 21 are connected in series between the high-potential rail 3 and the low-potential rail 4. The half-bridge 22 is connected on the input side between the center tap 25 of the half-bridge 20 and the center tap 31 of the half-bridge 21. The center tap 37 of the half-bridge 22 is connected to the associated phase terminal 6.

The half-bridges 20 and 21 are each designed to have a low inductance, and therefore the inductance of these half-bridges 20 and 21 is negligible. In particular, the parasitic inductance (not shown explicitly in FIG. 2) within each of the half-bridges 20 and 21 has a value of less than 100 nH.

On the other hand, shown in FIG. 2 in the manner of an equivalent circuit is
- an inductance 40 of inductance value L1 between the half-bridges 20 and 21,
- an inductance 41 of inductance value L2 between the half-bridges 20 and 22, and
- an inductance 42 of inductance value L3 between the half-bridges 21 and 22.

In addition, the figure shows within the half-bridge 22 between the semiconductor switch 35 and the center tap 37, and between the center tap 37 and the semiconductor switch 36, two further respective inductances 43 and 44 of inductance values L4 and L5 respectively.

The inductances 40 to 44 are preferably formed by discrete components in the form of chokes (i.e. magnetic reactance coils). Alternatively, however, it is also possible for one or more (i.e. at least two) or even all the inductances 40 to 44 to be formed by the respective parasitic inductances of the half-bridge circuit 5 associated with the construction and located at the respective points in the half-bridge circuit 5.

In each case, the inductances 40 to 44 are designed to have a value such that the total inductance Lg, given by the sum of the inductance values L1 to L5 (Lg=L1+L2+L3+L4+L5), is of such a value that the half-bridge circuit 5 can still reliably cut off a short-circuit inside the converter between the half-bridges 20 to 22 even when one of the semiconductor switches 23, 24, 29, 30, 35 or 36 or one of the clamping diodes 26, 27, 32, 33, 38 or 39 has failed by failing to go into the off-state and hence short-circuits the arm of the half-bridge circuit 5 associated therewith.

For this purpose, the total inductance Lg is chosen in a range between 100 nH and 10 µH. The total inductance is here preferably selected to be greater than 300 nH and/or less than 1 µH. In the specific embodiment, the total inductance is preferably specified according to the rated current In of the semiconductor switches 23, 24, 29, 30, 35, 36 and according to the input voltage Ue. In a particularly suitable design, the total inductance Lg is here specified such that the value of the mathematical product Lg·In/Ue lies in a range of 25 ns (nanoseconds) to 150 ns.

The design values stated above allow the following short-circuit paths arising within one inverter phase but across half-bridges to be cut off reliably:

1. First short-circuit path (short-circuit current driven by voltage Ud1):
   This first short-circuit path is closed via
   the capacitor 28
   semiconductor switch 23 or the parallel clamping diode 26,
   the inductance 41,
   the semiconductor switch 35 or the parallel clamping diode 38,
   the inductance 43,
   the inductance 44,
   the semiconductor switch 36 or the parallel clamping diode 39,
   the inductance 42,
   the clamping diode 32, and
   the inductance 40.

2. Second short-circuit path (short-circuit current driven by voltage Ud2):
   This second short-circuit path is closed via
   the capacitor 34
   the inductance 40
   clamping diode 27,
   the inductance 41,
   the semiconductor switch 35 or the parallel clamping diode 38,
   the inductance 43,
   the inductance 44,
   the semiconductor switch 36 or the parallel clamping diode 39,
   the inductance 42, and
   the semiconductor switch 30 or the parallel clamping diode 33.

3. Third short-circuit path (short-circuit current driven by both voltages Ud1 and Ud2):
   This third short-circuit path is closed via
   the capacitor 28,
   the semiconductor switch 23 or the parallel clamping diode 26,
   the inductance 41,
   the semiconductor switch 35 or the parallel clamping diode 38,
   the inductance 43,
   the inductance 44,
   the semiconductor switch 36 or the parallel clamping diode 39,
   the inductance 42,
   the semiconductor switch 30 or the parallel clamping diode 33,
   the capacitor 34 and
   the inductance 40.

In particular, designing the value of the total inductance Lg to be sufficiently large prevents electrical consequential faults in the above-mentioned short-circuit paths.

"Consequential fault" or "consequential failure" here denotes generally a failure (failure to go into the off-state) of a semiconductor switch or of the clamping diode connected in parallel therewith, which failure is triggered by the prior failure ("first fault" or "primary failure") of another semiconductor switch or another clamping diode. Such a consequential fault is referred to as a "electrical consequential fault" when the consequential fault is caused by an excess voltage or excess current resulting from the first fault.

The total inductance Lg can in principle be allocated in any way to the inductances 40 to 44. Preferably, however, the total inductance Lg is allocated as follows:
inductance 40: L1=¼ Lg
inductance 41: L1=¼ Lg
inductance 42: L1=¼ Lg
inductance 43: L1=⅛ Lg
inductance 44: L1=⅛ Lg For the converter 1 described above, the following fault variants may occur in particular:
1 Current flow via the semiconductor switches 23 and 35 or the parallel clamping diodes 36 and 26
  1.1 First fault: semiconductor switch 24 or clamping diode 27
    Inductance in the converter-internal short-circuit path: none
    Consequential fault: semiconductor switch 23 or clamping diode 26
    Still intact: semiconductor switches 29, 30, 35 and 36
    Counter EMF for the load short-circuit: Ud2
  1.2 First fault: semiconductor switch 36 or clamping diode 39
    Inductance in the converter-internal short-circuit path: Lg
    Consequential fault: none
    Still intact: semiconductor switches 23, 24, 29, 30 and 35
    No load short-circuit
  1.3 First fault: semiconductor switch 30 or clamping diode 33
    Inductance in converter-internal short-circuit path: Lg
    Consequential fault: none
    Still intact: semiconductor switches 23, 24, 29, 35 and 36
    No load short-circuit
2. Current flow via clamping diode 27 and semiconductor switch 35 or via clamping diode 38 and semiconductor switch 24
  2.1 First fault: semiconductor switch 23 or clamping diode 26
    Inductance in the converter-internal short-circuit path: none
    Consequential fault: semiconductor switch 24 or clamping diode 27
    Still intact: semiconductor switches 29, 30, 35 and 36
    Counter EMF for the load short-circuit: Ud2
  2.2 First fault: semiconductor switch 36 or clamping diode 39
    No converter-internal short-circuit path
    Consequential fault: none
    Still intact: semiconductor switches 23, 24, 29, 30 and 35
    No load short-circuit
  2.3 First fault: semiconductor switch 30 or clamping diode 33
    Inductance in the converter-internal short-circuit path: Lg
    Consequential fault: none
    Still intact: semiconductor switches 23, 24, 29, 35 and 36
    No load short-circuit
  2.3 Short-circuit between the high-potential rail 3 and the midpoint potential Counter EMF for the load short-circuit: Ud2

For further fault variants which differ from the cases described above in that they are mirror-image faults in the other inverter half for the case concerned, the conditions described above apply accordingly:
  1' Current flow via the semiconductor switches 36 and 30 or the parallel clamping diodes 33 and 39
    1.1' First fault: semiconductor switch 29 or clamping diode 32
      Inductance in the converter-internal short-circuit path: none
      Consequential fault: semiconductor switch 30 or clamping diode 33
      Still intact: semiconductor switches 23, 24, 35 and 36
      Counter EMF for the load short-circuit: Ud1 etc.

By designing the value of the total inductance Lg to be sufficiently large, short-circuits of the following types are reliably cut off for all the fault variants described above:
Short-Circuit Type 1:
In this case, one of the semiconductor switches 23, 24, 29, 30, 35 and 36 is switched on when there is an existing short-circuit.
Short-Circuit Type 2:
In this case, the short-circuit occurs while the semiconductor switch concerned 23, 24, 29, 30, 35 or 36 is on. In a standard case for this short-circuit type, the semiconductor switch 23, 24, 29, 30, 35 and 36 is conducting a non-zero current when the short-circuit occurs. In a special case for this short-circuit type, however, the load current is zero when the short-circuit occurs.
Short-Circuit Type 3:
In this case, the clamping diode 26, 27, 32, 33, 38 or 39 connected in parallel respectively with the semiconductor switch 23, 24, 29, 30, 35 or 36 is conducting before the short-circuit occurs.

The short-circuit types 1 to 3 introduced above are described in greater detail, for example, in S. Pierstorf, H.-G. Eckel: "Different Short Circuit Types of IGBT Voltage Source Inverters", PCIM Europe 2011, 17 to 19 May 2011, VDE Verlag (Berlin), ISBN 978-3-8007-3344-6.

In addition to the electrical consequential faults described above, it is always possible for mechanical or thermal consequential faults to occur in a converter 1 of the above-described type, for which faults the first fault, i.e. the failure of a first semiconductor switch 23, 24, 29, 30, 35, 36 or of the parallel-connected clamping diode 26, 27, 32, 33, 38, 39 triggers a consequential fault by mechanical interaction (e.g. flying parts) or thermal interactions (e.g. scorching by an electric arc that may occur).

In order to prevent losing the reliable cut-off capability of the converter 1 in the event of a short-circuit as a result of such a mechanical or thermal consequential fault, the half-bridges 20 to 22 are preferably mechanically separated from one another. This separation can in principle be implemented by the half-bridges 20 to 22 being spaced sufficiently far apart from one another. The half-bridges 20 to 22, however, are preferably separated from one another by partition walls in an explosion-proof and arc-proof manner. In particular, each of the half-bridges 20 to 22 shown in FIG. 2 is encapsulated in a separate housing 50 and is hence separated from the respective other half-bridges 20 to 22. In a suitable embodiment, each housing 50 has walls made of sheet steel with a minimum wall thickness of 1 mm or made of plastic with a minimum wall thickness of 5 mm.

Given that the converter 1 shown in FIG. 1 has a multi-phase design, a plurality of half-bridges 20 to 22 can also be arranged jointly in one housing 50 provided that these half-bridges 20 to 22 belong to different half-bridge circuits 5 (i.e. different converter phases). For example, the half-bridges 20 of the three half-bridge circuits 5 of the converter 1 are arranged jointly in a first housing 50, whereas the half-bridges 21 of the three half-bridge circuits 5 are arranged jointly in a second housing 50, and the three half-bridges 22 of the three half-bridge circuits 5 are arranged in a third housing 50.

In order to eliminate electrical flashovers between the high-potential rail 3 and the low-potential rail 4 of the DC circuit 2, a partition wall 51 made of electrically conductive material, in particular sheet steel, is arranged between the high-potential rail 3 and the low-potential rail 4, which wall is electrically set to the midpoint potential between the potential of the high-potential rail 3 and the potential of the low-potential rail 4. For this purpose, the inductance 40 is split into two series-connected partial inductances 52 and 53 of identical inductance value L11 (where L1=2·L11). The partition wall 51 here makes contact with a center tap 54 between the partial inductances 52 and 53.

The center taps 54 of the three half-bridge circuits 5 are shorted together so that there is a common midpoint potential for all three half-bridge circuits 5. As an alternative to this, one instance of the inductance 40 (in FIG. 2 split into the partial inductances 52 and 53) exists for all three half-bridge circuits, so that again a single midpoint potential is defined for all the half-bridge circuits 5. In this case, the high-potential side input half-bridges 20 of all the half-bridge circuits 5 are connected in parallel to the positive terminal of the common inductance 40, whereas the low-potential side input half-bridges 21 of all the half-bridge circuits 5 are connected in parallel to the negative terminal of the inductance 40.

To summarize, the invention, in particular the exemplary embodiment described above, defines a three-level active neutral-point-clamped converter, in which a sufficiently large inductance is introduced into the potential converter-internal short-circuit path across the three half-bridges of one converter phase for the semiconductor switches 23, 30, 35 and 36 to be able to cut off reliably short-circuits in this short-circuit path in all operating points.

The above-described exemplary embodiment explains the subject matter of the invention particularly clearly. Nevertheless, the invention is not restricted to this exemplary embodiment. In fact a person skilled in the art can derive further embodiments of the invention from the above description and the claims.

What is claimed is:

1. A three-level converter, comprising:
   an input-side DC circuit having a high-potential rail and a low-potential rail;
   at least one half-bridge circuit, the half-bridge circuit having a high-potential side input half-bridge, a low-potential side input half-bridge and an output half-bridge, wherein the two input half-bridges are connected in series between the high-potential rail and the low-potential rail of the input-side DC circuit, and the output half-bridge is connected between a center tap of the high-potential side input half-bridge and a center tap of the low-potential side input half-bridge, and
   a phase terminal connected to a center tap of the output half-bridge, said phase terminal being adapted to be connected to a load circuit,
   wherein the total of the inductance within the output half-bridge connected between the high-potential side input half-bridge and the low-potential side input half-bridge, and the inductance between the high-potential side input half-bridge and the output half-bridge, and the inductance between the low-potential side input half-bridge and the output half-bridge is designed to have a value such that, in the event of a failure of any one power semiconductor in the half-bridge circuit, a short-circuit via a short-circuit path formed between the three half-bridges of the half-bridge circuit can be reliably cut off by the intact power semiconductors in that short-circuit path,
   wherein the value of said total inductance has an inductance value between 100 nH and 10 μH, and
   wherein the three-level converter is designed for use in a Megawatt range of 1 MW-20 MW.

2. The three-level converter of claim 1, wherein a load circuit is connected to the phase terminal.

3. The three-level converter of claim 1, further comprising at least one choke arranged within the output half-bridge.

4. The three-level converter of claim 1, further comprising at least one choke arranged between the high-potential side input half-bridge and the low-potential side input half-bridge.

5. The three-level converter of claim 1, further comprising at least one choke arranged between the high-potential side input half-bridge and the output half-bridge.

6. The three-level converter of claim 1, further comprising at least one choke arranged between the low-potential side input half-bridge and the output half-bridge.

7. The three-level converter of claim 1, wherein the three half-bridges of the same half-bridge circuit are spaced apart in such a way as to rule out mechanical or thermal damage to, or impairment of, one half-bridge by one of the two other half-bridges.

8. The three-level converter of claim 1, wherein the three half-bridges of the same half-bridge circuit are mechanically separated from one another in such a way as to rule out mechanical or thermal damage to, or impairment of, one half-bridge by one of the two other half-bridges.

9. The three-level converter of claim 1, wherein the DC circuit is designed in such a way as to rule out an electrical flashover between the high-potential rail and the low-potential rail.

10. The three-level converter of claim 1, wherein the high-potential side input half-bridge and the low-potential side input half-bridge are each designed to have a low inductance.

* * * * *

UNITED STATES PATENT AND TRADEMARK OFFICE
CERTIFICATE OF CORRECTION

PATENT NO. : 9,929,677 B2
APPLICATION NO. : 14/905613
DATED : March 27, 2018
INVENTOR(S) : Hans-Günter Eckel Page 1 of 1

It is certified that error appears in the above-identified patent and that said Letters Patent is hereby corrected as shown below:

On the Title Page

[73] Assignee: correct the assignee's name to read --Siemens Aktiengesellschaft--.

Signed and Sealed this
Second Day of October, 2018

Andrei Iancu
*Director of the United States Patent and Trademark Office*